US012700648B2

(12) United States Patent
Rock et al.

(10) Patent No.: US 12,700,648 B2
(45) Date of Patent: Aug. 4, 2026

(54) CELL CONNECTION UNIT FOR A BATTERY MODULE

(71) Applicant: SAMSUNG SDI CO., LTD., Yongin-si (KR)

(72) Inventors: Alexander Rock, Trofaiach (AT); Fritz Haring, Bruck an der Mur (AT); Stefan Brandstätter, Gratwein-Straßengel (AT); Thomas Brandner, Rosental (AT)

(73) Assignee: Samsung SDI Co., Ltd., Yongin-si (KR)

(*) Notice: Subject to any disclaimer, the term of this patent is extended or adjusted under 35 U.S.C. 154(b) by 274 days.

(21) Appl. No.: 17/162,085

(22) Filed: Jan. 29, 2021

(65) Prior Publication Data

US 2021/0249739 A1     Aug. 12, 2021

(30) Foreign Application Priority Data

Feb. 6, 2020     (EP) ..................................... 20155938
Jan. 27, 2021     (KR) ........................ 10-2021-0011896

(51) Int. Cl.
*H01M 50/507*     (2021.01)
*H01M 50/209*     (2021.01)
(Continued)

(52) U.S. Cl.
CPC ....... *H01M 50/507* (2021.01); *H01M 50/209* (2021.01); *H01M 50/503* (2021.01); *H01R 11/288* (2013.01)

(58) Field of Classification Search
CPC .............. H01M 50/20; H01M 50/209; H01M 50/503–507; H01M 50/211;
(Continued)

(56) References Cited

U.S. PATENT DOCUMENTS 9,768,432 B2     9/2017 Fink
2011/0143179 A1*     6/2011 Nakamori ................ B60K 1/04
429/99
(Continued)

FOREIGN PATENT DOCUMENTS

CN     105659439 A     6/2016
DE     102011109230 A1     2/2013
(Continued)

OTHER PUBLICATIONS

DE 102013222090 A1—English Translation from EPO, accessed via Espacenet on Mar. 12, 2024 (Year: 2015).*
(Continued)

*Primary Examiner* — Allison Bourke
*Assistant Examiner* — Bethany C Garcia
(74) *Attorney, Agent, or Firm* — Lee IP Law, P.C.

(57) ABSTRACT

A cell connection unit (CCU) for connecting a plurality of aligned battery cells of a battery module and a battery module including the CCU, the CCU including a plurality of busbars, each busbar of the plurality of busbars being connected to cell terminals of at least two battery cells of the plurality of aligned battery cells; and a plurality of carrier rails, at least some carrier rails of the plurality of carrier rails being mechanically connected to at least three busbars of the plurality of busbars, wherein the at least some carrier rails of the plurality of carrier rails include a first reception region connected to at least one busbar of the at least three busbars of the plurality of busbars, and a separate second reception region connected to two busbars of the at least three busbars of the plurality of busbars and electrically insulating the two busbars from each other.

16 Claims, 9 Drawing Sheets

(51) Int. Cl.
    H01M 50/503     (2021.01)
    H01R 11/28     (2006.01)

(58) Field of Classification Search
    CPC ............ H01M 50/249; H01M 50/258; H01M 50/204; H01M 50/256; H01M 50/55; H01M 50/271; H01M 50/553; H01M 50/502; H01M 50/51; H01M 50/588; H01M 50/295; H01M 50/505; H01M 10/425; H01M 50/514; H01M 50/517; H01M 2220/20; H01M 50/516; H01M 50/519; H01M 50/509; H01M 50/244; H01M 50/291; H01M 50/569; H01M 50/26–296; H01M 50/50–598; H01R 11/288; H01R 25/16–162; H01R 13/02–4368; H01R 25/162; H01R 4/48; H01R 4/38; H01R 9/226; H01R 9/2608; H01R 9/2675; H01R 12/79; H01R 4/30–48; H01R 11/01–32; Y02E 60/10; Y02E 60/50; Y02P 70/50; Y02T 10/70
See application file for complete search history.

(56)         References Cited

U.S. PATENT DOCUMENTS

| | | | |
|---|---|---|---|
| 2014/0079982 A1 | 3/2014 | Laderer et al. | |
| 2015/0162578 A1 | 6/2015 | Kim et al. | |
| 2015/0171405 A1* | 6/2015 | Lee ....................... | H01M 50/30 29/857 |
| 2016/0240280 A1 | 8/2016 | Dressel et al. | |
| 2017/0149225 A1* | 5/2017 | Imai ................... | H01M 50/516 |
| 2020/0020913 A1* | 1/2020 | Matsumura ......... | H01M 50/507 |
| 2020/0396830 A1* | 12/2020 | Yasuda .............. | H01M 50/291 |
| 2020/0403207 A1* | 12/2020 | Okazaki ............. | H01M 50/507 |

FOREIGN PATENT DOCUMENTS

| | | | | |
|---|---|---|---|---|
| DE | 102013221872 A1 | | 10/2013 | |
| DE | 102013222090 A1 | * | 4/2015 | ........... H01M 2/206 |
| EP | 2956976 B1 | | 9/2017 | |
| JP | 2010-097722 A | | 4/2010 | |
| KR | 10-2016-0075876 A | | 6/2016 | |
| WO | WO 2012/164042 A1 | | 12/2012 | |

OTHER PUBLICATIONS

Extended European Search Report dated Jul. 16, 2020.
Chinese Office action dated Nov. 9, 2022, and Search report dated Nov. 2, 2022.
European Office action dated Nov. 10, 2022.
Office Action dated Jul. 15, 2023, of the corresponding Chinese Patent Application No. 202110135737.4.

* cited by examiner

CELL CONNECTION UNIT FOR A BATTERY MODULE

CROSS-REFERENCE TO RELATED APPLICATION

European Patent Application No. 20155938.2, filed on Feb. 6, 2020, in the European Intellectual Property Office, and entitled: "Cell Connection Unit, CCU, for a Battery Module" and Korean Patent Application No. 10-2021-0011896, filed on Jan. 27, 2021, in the Korean Intellectual Property Office, and entitled: "Cell Connection Unit and Battery Module including The Same" are incorporated by reference herein in its entirety.

BACKGROUND

1 Field

Embodiments relate to a cell connection unit (CCU) for a battery module.

2. DESCRIPTION OF THE RELATED ART

A rechargeable or secondary battery differs from a primary battery in that it can be repeatedly charged and discharged, while the latter provides only an irreversible conversion of chemical to electrical energy. Low-capacity rechargeable batteries may be used as power supply for electronic devices, such as cellular phones, notebooks, and camcorders, while high-capacity rechargeable batteries may be used as power supply for hybrid vehicles or the like.

In general, rechargeable batteries may include an electrode assembly including a positive electrode, a negative electrode, and a separator between the positive and negative electrodes, a case accommodating the electrode assembly, and an electrode terminal electrically connected to the electrode assembly. An electrolyte solution may be injected into the case in order to enable charging and discharging of the battery via an electrochemical reaction of the positive electrode, the negative electrode, and the electrolyte solution. The shape of the case, e.g., cylindrical or rectangular, depends on the battery's intended purpose.

Rechargeable batteries may be used as a battery module formed of a plurality of unit battery cells coupled in series and/or in parallel so as to provide a high energy density, e.g., for motor driving of a hybrid vehicle. That is, the battery module may be formed by interconnecting the electrode terminals of the plurality of unit battery cells depending on a required amount of power and in order to realize a high-power rechargeable battery, e.g., for an electric vehicle.

Battery modules may be constructed either in block design or in modular design. In block designs, each battery cell may be coupled to a common current collector structure and a common battery management system. In modular designs, pluralities of battery cells may be connected to form submodules and several submodules may be connected to form the battery module. Battery management functions may be realized either on module or submodule level and interchangeability of the components may be improved. One or more battery modules may be mechanically and electrically integrated, equipped with a thermal management system, and set up for communication with electrical consumers in order to form a battery system.

SUMMARY

The embodiments may be realized by providing a cell connection unit (CCU) for connecting a plurality of aligned battery cells of a battery module, the CCU including a plurality of busbars, each busbar of the plurality of busbars being connected to cell terminals of at least two battery cells of the plurality of aligned battery cells; and a plurality of carrier rails, at least some carrier rails of the plurality of carrier rails being mechanically connected to at least three busbars of the plurality of busbars, wherein the at least some carrier rails of the plurality of carrier rails include a first reception region connected to at least one busbar of the at least three busbars of the plurality of busbars, and a separate second reception region connected to two busbars of the at least three busbars of the plurality of busbars and electrically insulating the two busbars from each other.

One carrier rail of the at least some carrier rails of the plurality of carrier rails may extend in a longitudinal direction, and the first reception region may include a reception space oriented in the longitudinal direction of the one carrier rail.

One carrier rail of the at least some carrier rails of the plurality of carrier rails may extend in a longitudinal direction, and the second reception region may include a first reception aperture oriented in a first direction perpendicular to the longitudinal direction of the one carrier rail and a second reception aperture oriented in a second direction opposite to the first direction.

The plurality of carrier rails may be formed of a plastic material.

The plurality of busbars and the plurality of carrier rails may be interconnected in a rigid structure, for automated mounting of the CCU to the battery module.

Each of the first and second reception apertures may include a guide that is configured to receive a corresponding connection portion of the busbar and a latch that is configured to latch the corresponding connection portion of the busbar.

The plurality of busbars may include two terminal busbars connected to cell terminals of "n" number of battery cells, and inset busbars connected to cell terminals of "2n" number of battery cells, and the plurality of carrier rails may include two terminal carrier rails forming terminal ends of the CCU, and inset carrier rails.

The two terminal carrier rails may include two third reception regions at terminal ends thereof, and each third reception region may include a single reception aperture.

Each busbar of the plurality of the busbars may include a first connection portion protruding from a first short side thereof and a second connection portion protruding from a second short side thereof opposite the first short side, and the first and second connection portions may be accommodated in corresponding ones of the first and second reception apertures.

A middle portion of each inset busbar may be accommodated in a corresponding reception space of a corresponding first reception region.

The at least some of the carrier rails of the plurality of carrier rails may include a module cover mount, a temperature sensor mount, or cable clips.

The two terminal carrier rails may further include a battery module housing attachment.

The embodiments may be realized by providing a battery module including a plurality of battery cells aligned in a stacking direction of the battery module, each battery cell including a cell cover with a first terminal and a second terminal; a plurality of busbars, the plurality of busbars including two terminal busbars, each terminal bus bar being connected to cell terminals of "n" number battery cells, and remaining busbars being inset busbars connected to cell terminals of "2n" number of battery cells; and a plurality of carrier rails, the plurality of carrier rails including two terminal carrier rails and remaining carrier rails being inset carrier rails, wherein each terminal carrier rail is connected to a corresponding terminal busbar and a corresponding inset busbar, and wherein each inset carrier rail includes a first reception region connected to a middle portion of one insert busbar, and a separate second reception region including a first reception aperture connected to a connection portion of another insert busbar, and a second reception aperture opposite to and insulated from the first reception aperture and being connected to a connection portion of yet another insert busbar or of one terminal busbar.

The battery module may further include a battery module cover including a plurality of first connection openings, wherein first connection pins protrude from the carrier rails in a normal direction of the cell covers and are accommodated in respective ones of the plurality of first connection openings of the battery module cover.

The battery module may further include two first housing profiles, each extending along sides of the aligned battery cells in the stacking direction; and two second housing profiles, each extending along a terminal battery cell of the aligned battery cells in a direction perpendicular to the stacking direction, wherein second connection pins protrude from the plurality of carrier rails in a direction opposite a normal direction of the cell covers and are accommodated in second connection openings of the first or second housing profiles.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
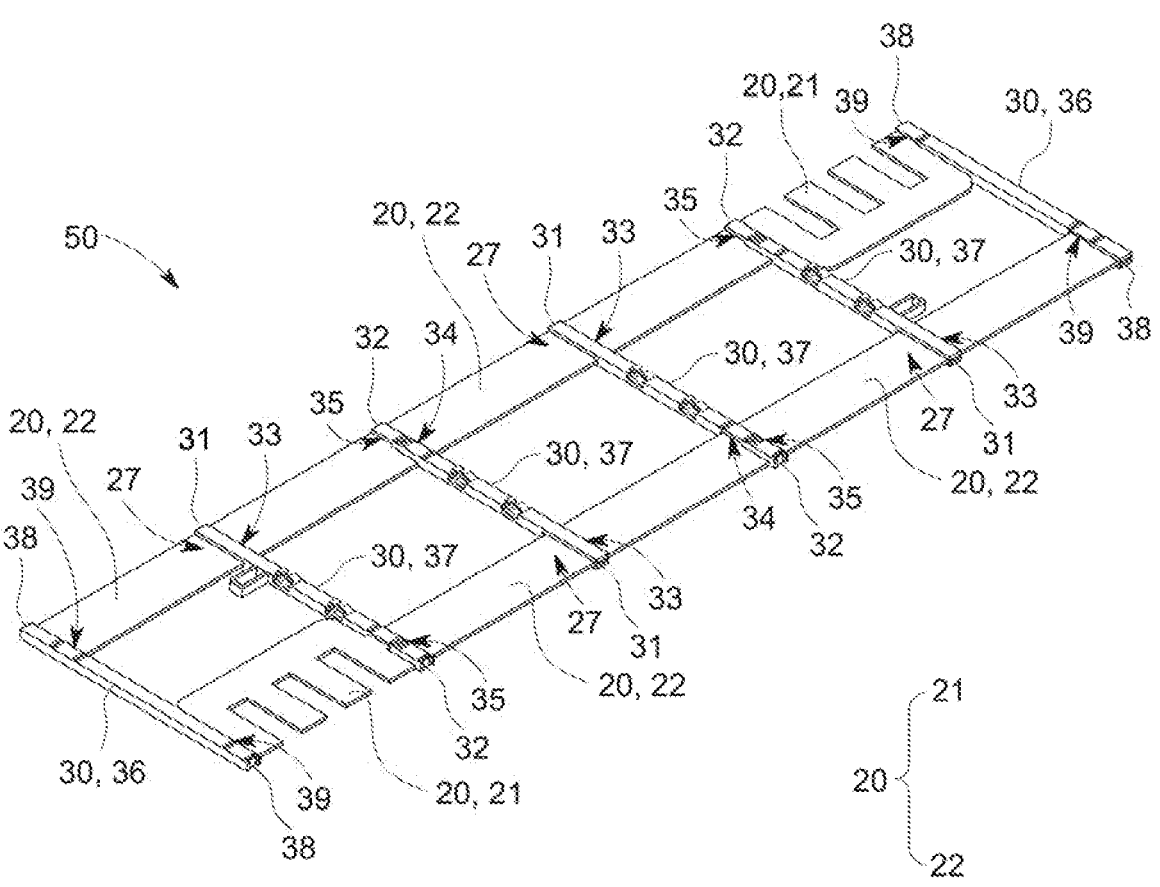
FIG. 1 illustrates a cell connection unit, CCU, according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated [0035] for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Further, the use of "may" when describing embodiments refers to one or more embodiments. In the following description of embodiments, the terms of a singular form may include plural forms unless the context clearly indicates otherwise. Expressions such as "at least one of," when preceding a list of elements, modify the entire list of elements and do not modify the individual elements of the list.

It will be understood that although the terms "first" and '7 second" are used to describe various elements, these elements should not be limited by these terms. These terms are only used to distinguish one element from another element, and are not intended to imply or require sequential inclusion. For example, a first element may be named a second element and, similarly, a second element may be named a first element, without departing from the scope of the embodiments. As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" or "about" is used in combination with a feature that could be expressed using a numeric value, the term "substantially" or "about" denotes a range of +/−5% of the value centered on the value.

FIG. 1 illustrates a cell connection unit 50, CCU, according to an embodiment of the present disclosure. The CCU 50 may include a plurality of busbars 20 that are interconnected by a plurality of carrier rails 30 to form a rigid structure. In an implementation, the busbars 20 may include, e.g., two terminal busbars 21 and four inset busbars 22. The terminal busbars 21 may be about half as long as the inset busbars 22 and may be further configured to form module terminals, e.g., to be externally contacted. The carrier rails 30 may include two terminal carrier rails 36 that are at terminal ends of the CCU 50 and remaining (e.g., four) carrier rails 30 may be inset carrier rails 37. The carrier rails 30 may be formed of a plastic material. Each of the inset carrier rails 37 may include a first reception region 31 at a first terminal end and a second reception region 32 at an opposite second terminal end. Each of the terminal carrier rails 36 may include two third reception regions 38, one at each terminal end of the terminal carrier rail 36.

Each of the two third reception regions 38 may include a third reception aperture 39, a connection portion of a corresponding terminal busbar 21 may be received in one of the third reception apertures 39, and a connection portion of a corresponding inset busbar 22 may be received in the other third reception aperture 39. Each first reception region 31 of the inset carrier rails 37 may include a reception space 33, and a middle portion 27 of a corresponding inset busbar 22 may be received in the reception space 33. Further, each second reception region 32 of the inset carrier rails 37 may include a first reception aperture 34 and a second reception aperture 35 that are shown in more detail in FIGS. 5 to 7.

Figure 9:
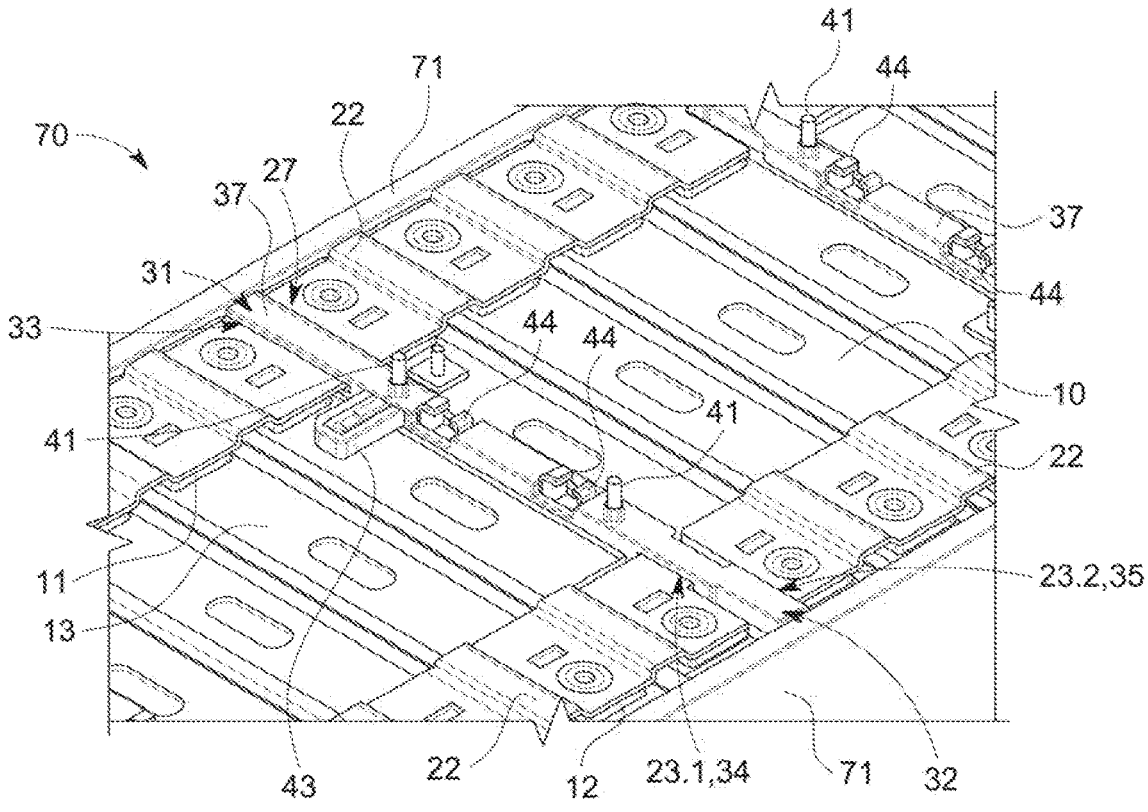
FIG. 9 illustrates details of a carrier rail according to an embodiment.

The first reception aperture 34 may be an opening that faces in a direction that is perpendicular to a longitudinal (e.g., lengthwise or long axis) direction of the carrier rail 30, and the second reception aperture 35 may be an opening that faces in an opposite direction than the first reception aperture 34. A first connection portion (or protruding connection portion) 23.1 may protrude from a second short side 24.2 of one inset busbar 22 and may be inserted into the first reception aperture 34. A second connection portion (or another protruding connection portion) 23.2 may protrude from a first short side 24.1 of another inset busbar 22 and may be inserted into the second reception aperture 35. Each of the inset busbars 22 may include the first short side 24.1 with the other protruding connection portion 23.2 and an opposite second short side 24.2 with the protruding connection portion 23.1 (Refer to FIG. 5). Each of the first and second reception apertures 34, 35 may include guides 45 and latches 46. The guides 45 may be formed as two linearly extending protrusions that may be fitted to corresponding or complementary recesses in the connection portions 23.1, 23.2. The corresponding shapes of the connection portions 23.1, 23.2 and the guide 45 may help ensure that the inset busbars 22 can be inserted into the reception apertures 34, 35 only with a predefined orientation. Further, the latches 46 may be elastically biased in a manner that may be pushed or deformed sideways by fittingly shaped latching elements of the connection portions 23.1, 23.2 and that form indentations with those elements (e.g., the latches 46 may have an interengaging latching shape relative to the latching elements or hooks of the connection portions 23.1, 23.2). Hence, the connection portions 23.1, 23.2 may not be easily removed by pulling, once those connection portions 23.1, 23.2 are inserted into the reception apertures 34, 35 (Refer to FIG. 6). The third reception apertures 39 of the third reception regions 38 of the terminal carrier rails 36 may include similar guides and latches. The reception space 33 is illustrated in FIG. 9, and may have a U-shape, the opening width of which corresponds to the middle portion 27 of an inset busbar 22 and the opening depth, e.g., longitudinal extension, may correspond to the width of an inset busbar 22.

At least some of the carrier rails 30 of the CCU 50, e.g., each of the inset carrier rails 37, may be mechanically connected to at least three busbars. In each of the inset carrier rails 37, the first reception region 31 may be connected to at least one bus bar and the second reception region 32 may be connected to two busbars, and may electrically insulate these two busbars from each other. The design of the terminal carrier rails 36 may differ from the design of the inset carrier rails 37, e.g., the terminal carrier rails 36 may connect fewer busbars than the inset carrier rails 37.

Figure 2:
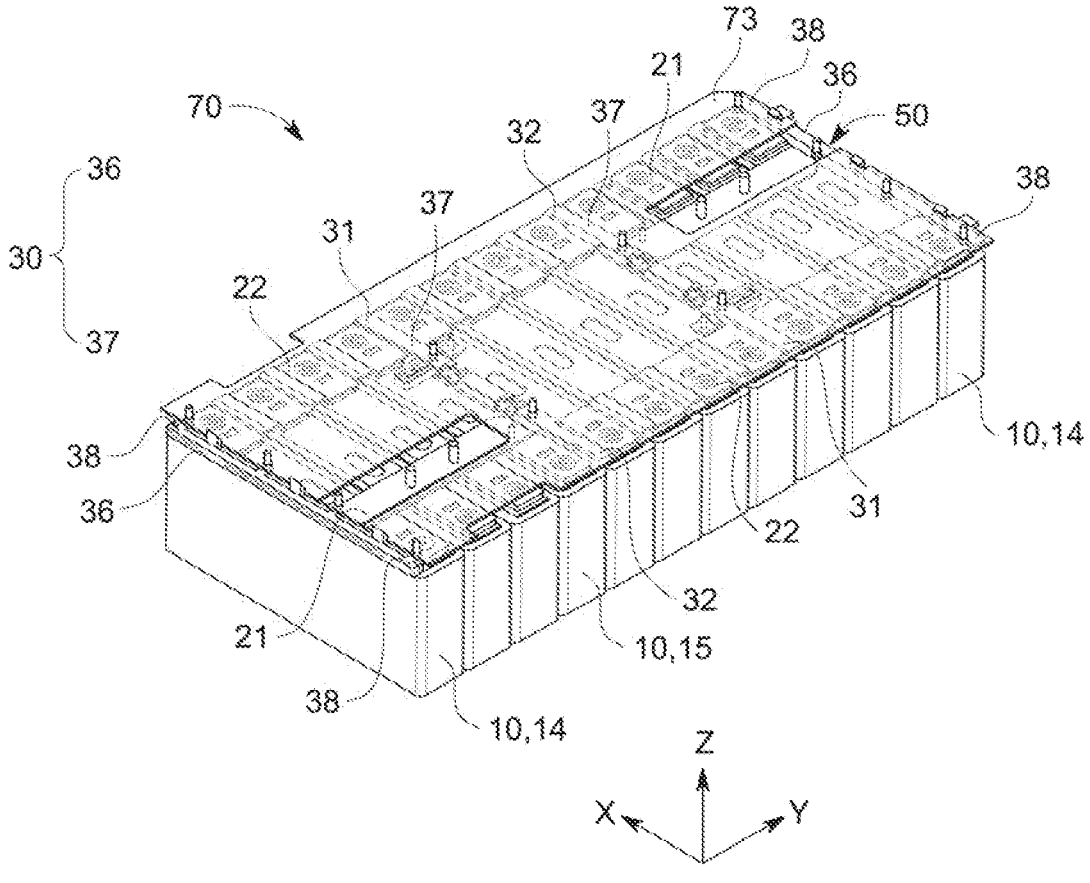
FIG. 2 illustrates a battery module according to an embodiment.
Figure 3:
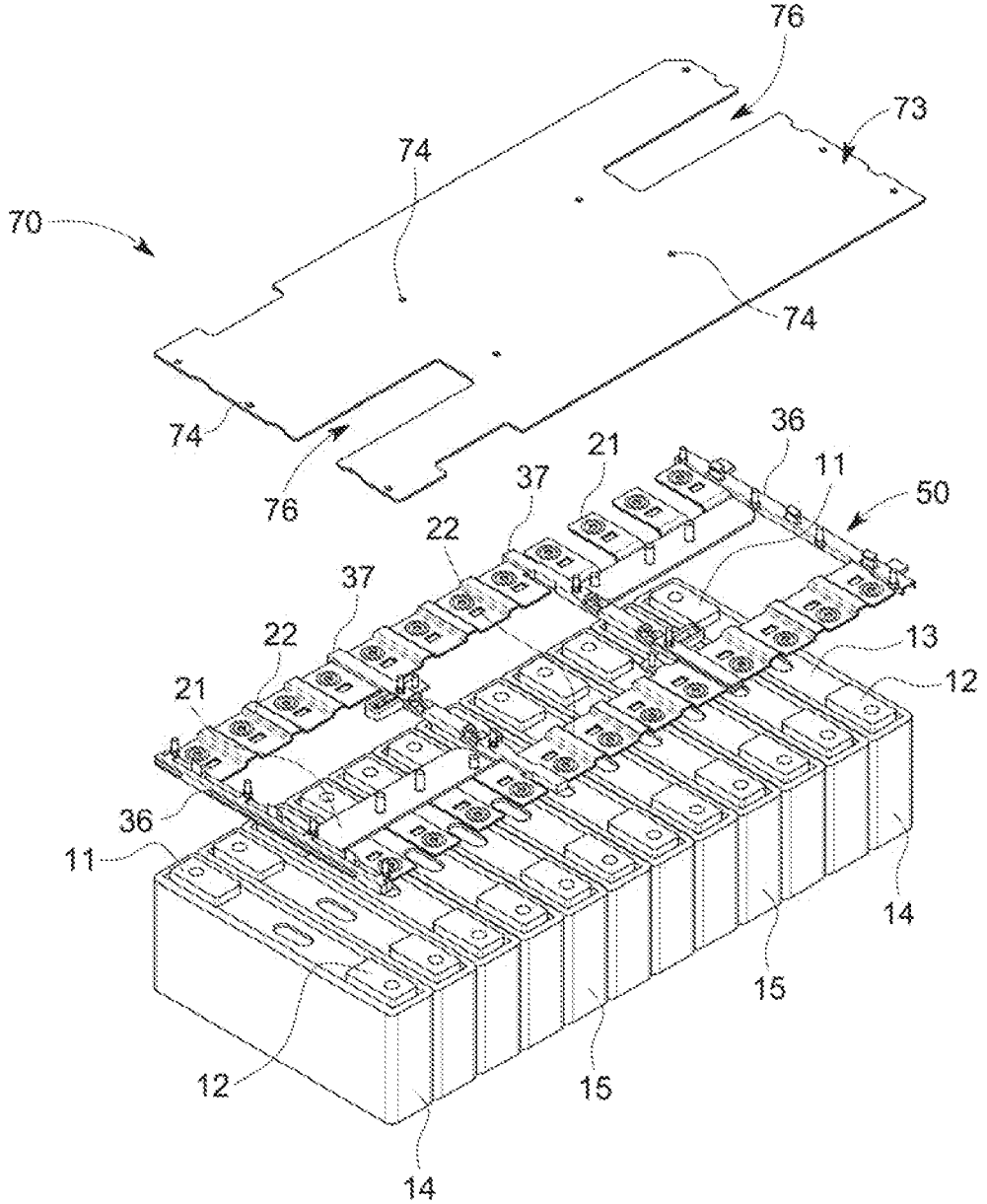
FIG. 3 illustrates an exploded view of the battery module of FIG. 2.

FIG. 2 illustrates a perspective view of a battery module 70 according to an embodiment and FIG. 3 illustrates an exploded view of the battery module 70 of FIG. 2, that includes a CCU 50 according to an embodiment. The battery module 70 may include a plurality of battery cells 10 that are aligned in a stacking direction (Y direction) of the battery module 70. The stacking direction may be perpendicular to a longitudinal direction (X direction) of the carrier rails 30. The battery cells 10 may include terminal battery cells 14 and inset battery cells 15 stacked in between the terminal battery cells 14. Each battery cell 10 may include a cell cover 13 on which a first, e.g., positive, cell terminal 11 and a second, e.g., negative, cell terminal 12 are arranged. The battery module 70 may include a total of twelve battery cells 10 that are arranged in a 4p3s configuration, e.g., with four battery cells 10 electrically connected in parallel and three groups of the battery cells 10 electrically connected in series.

The CCU 50 according to an embodiment may be connected to the aligned battery cells 10. The CCU 50 according to the present embodiment may be different from the CCU 50 as illustrated in FIG. 1. In an implementation, as illustrated in FIG. 2, the CCU 50 may include two terminal carrier rails 36 and two inset carrier rail 37 and may also include two terminal busbars 21 and two inset busbars 22 disposed opposite each other with a predetermined distance therebetween. The predetermined distance may correspond to a distance between the positive cell terminal 11 and the negative cell terminal 12 of one battery cell 10. The CCU 50 may be connected to the aligned battery cells 10 such that each terminal busbar 21 and each inset busbar 22 is connected to one terminal battery cell 14, respectively. The terminal busbars 21 may be further connected to three inset battery cells 15, and the inset busbars 22 may be further connected to seven inset battery cells 15. In an implementation, each inset busbar 22 may be connected to one terminal carrier rail 36 and two inset carrier rails 37. Above these differences, the CCU 50 of FIGS. 2 and 3 is similar to the CCU 50 of FIG. 1 and as described above.

The battery module 70 may further include a module cover 73 on top of the CCU 50 such that the CCU 50 is between the battery cells 10 and the module cover 73. The module cover 73 may be made of insulating plastic material in order to electrically insulate the busbars 20 from the environment and may help protect the battery module 70 from external influences. The module cover 73 may include a plurality of first connection openings 74 that are connected to or coupled with first connection pins 41 (Refer to FIGS. 8 to 11) that protrude from the carrier rails 30 in a normal direction (e.g., Z direction) of the cell covers 13 of the battery cells 10 below. The module cover 73 may further include third connection openings 76 on or aligned with the terminal busbars 21 in order to allow for externally contacting the terminal busbars 21.

Figure 4:
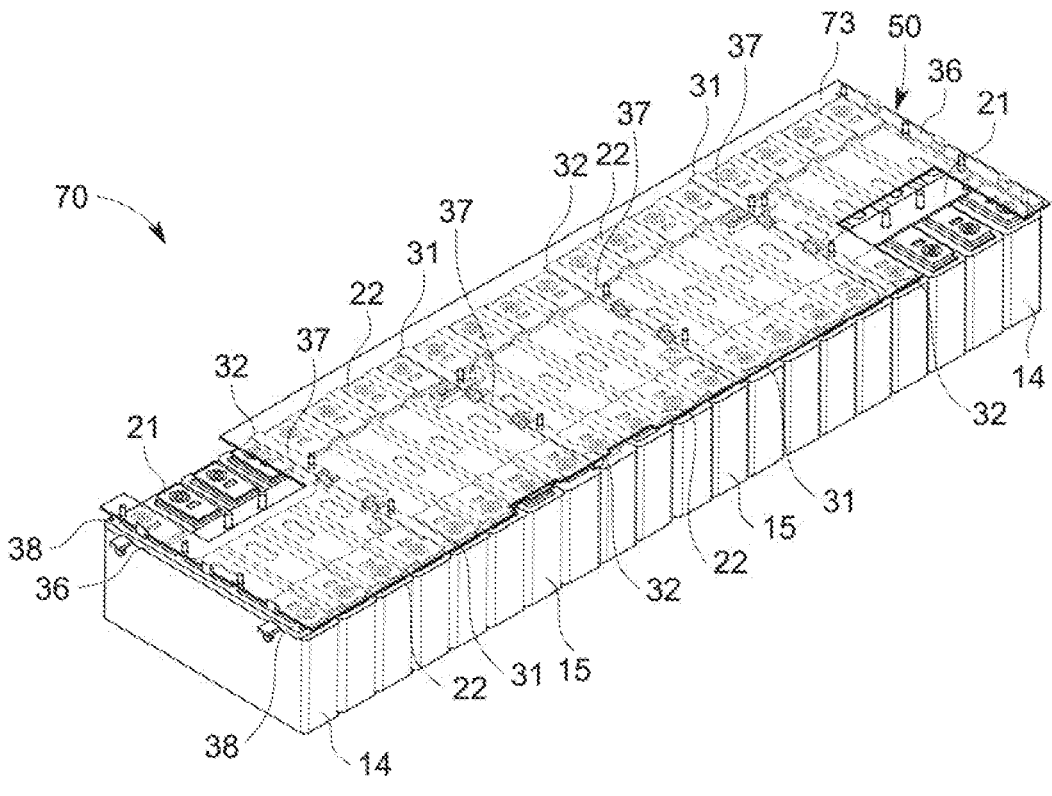
FIG. 4 illustrates a battery module according to another embodiment.

FIG. 4 illustrates a battery module 70 according to another embodiment. The battery module 70 may include a total of twenty battery cells 10 that are arranged in a 4p5s configuration, e.g., with four battery cells 10 connected in parallel and five groups of the battery cells 10 connected in series. The aligned battery cells 10 may include two terminal battery cells 14, and the remaining battery cells 10 may be inset battery cells 15. The individual cells 10 may be identical to the battery cells 10 as described with respect to FIGS. 2 and 3. The aligned battery cells 10 may be connected to the CCU 50 of FIG. 1 as described above with respect to FIG. 1. In an implementation, the CCU 50 may be connected to the aligned battery cells 10 such that each terminal battery cell 14 is connected to a terminal busbar 21 and to an inset busbar 22, respectively. The terminal busbars 21 may be further connected to three inset battery cells 15 and the inset busbars 22, which are connected to a terminal battery cell 14, may be further connected to seven inset battery cells 15. In an implementation, the two inset busbars 22 that are connected to a terminal battery cell 14 may be connected to one terminal carrier rail 36 and two inset carrier rails 37, respectively. The two other inset busbars 22 may each be connected to three inset carrier rails 37 without being connected to a terminal carrier rail 36. The battery module 70 of FIG. 4 also includes a module cover 73 that is connected to the CCU 50 via connection pins of the CCU 50 and connection openings of the battery module cover 73.

Figure 5:
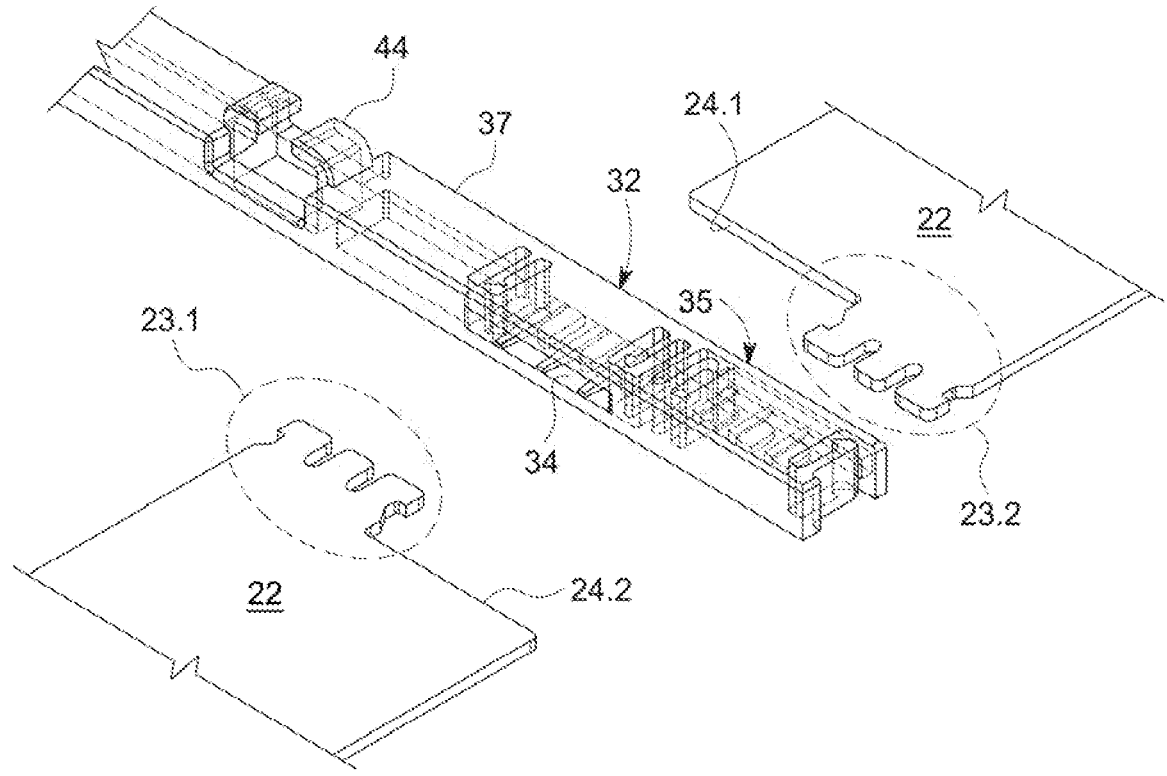
FIG. 5 illustrates a second reception region of a carrier rail of an embodiment.
Figure 6:
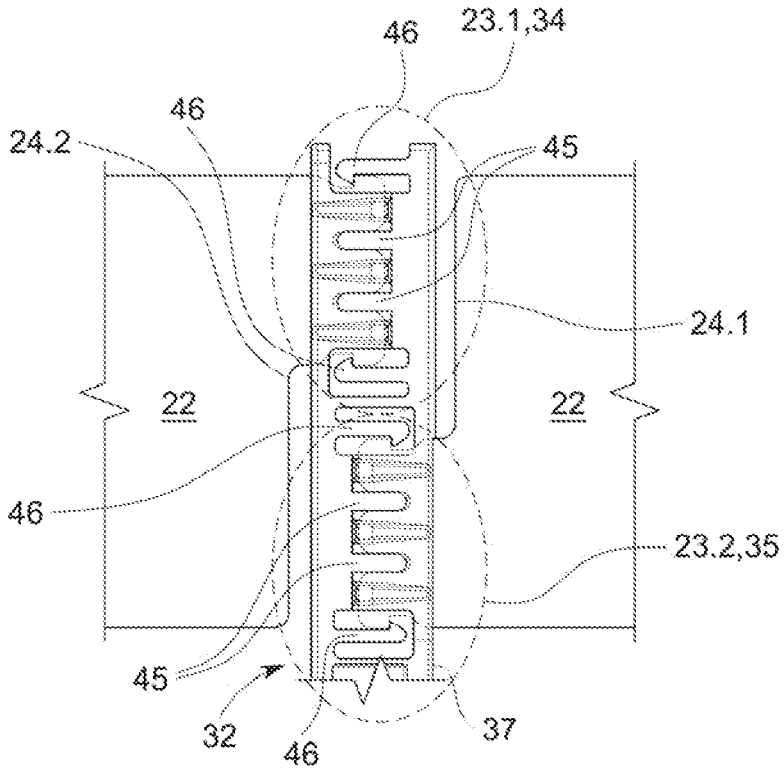
FIG. 6 illustrates a top view of the second reception region of FIG. 5.
Figure 7:
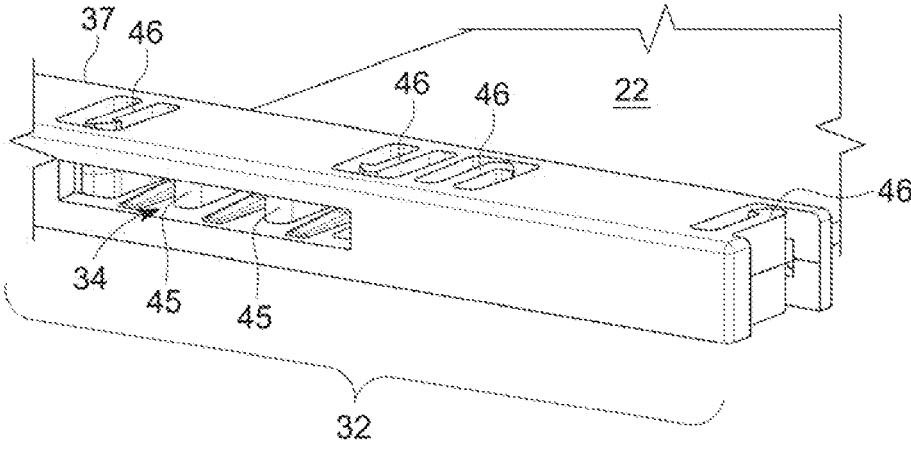
FIG. 7 illustrates a side view of the second reception region of FIG. 5.

FIGS. 5 to 7 illustrate a second reception region 32 of an inset carrier rail 37 of an embodiment in more detail as already described above. FIGS. 5 to 7 show the configuration of the first reception aperture 34 and of the second reception aperture 35, each having the guide 45 and latch 46. FIGS. 5 to 7 further illustrate the configuration of the connection portions 23.1, 23.2 of the inset busbars 22, e.g., with corresponding guides and latches. FIGS. 5 and 7 show perspective views of the second reception region 32 and FIG. 6 shows a top view on the second reception region 32. Connection portions of the terminal busbars 21 may be configured similarly to the connection portions 23.1, 23.2 of the inset busbars 22 and the third reception apertures 39 of the terminal carrier rails 36 may be configured similarly to the first and second reception apertures 34, 35.

Figure 8:
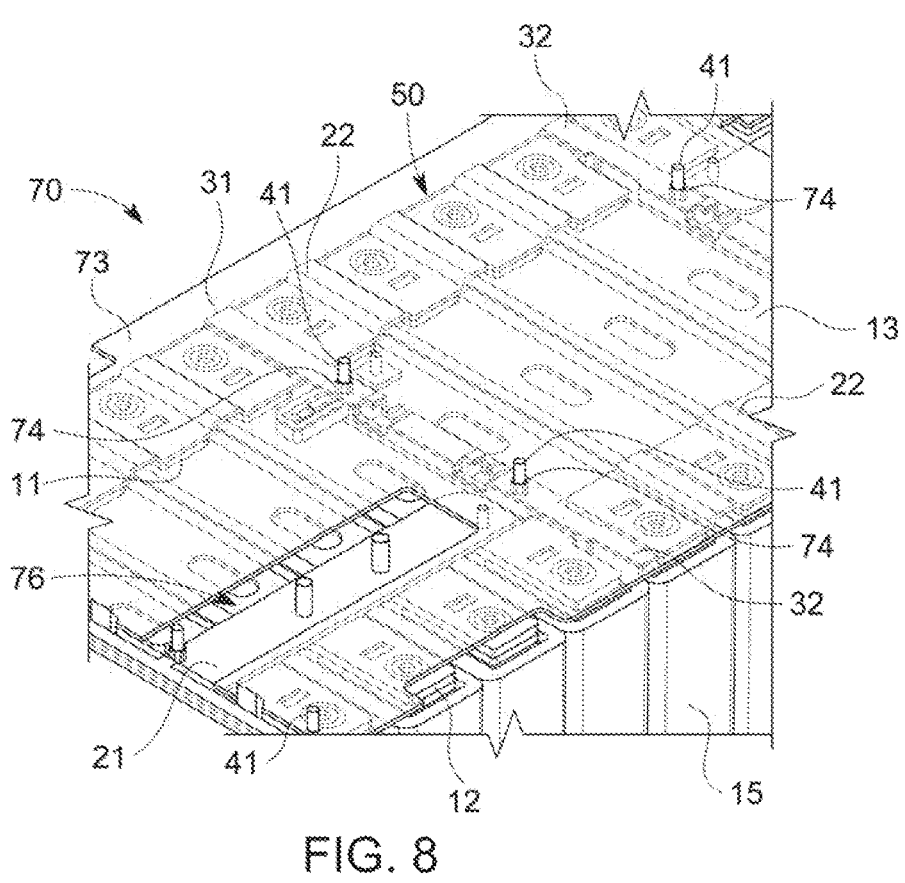
FIG. 8 illustrates a cover of a battery module according to an embodiment.

FIGS. 8 to 11 illustrate various details of a battery module 70 according to an embodiment. FIG. 8 illustrates a detailed view of a module cover 73 of a battery module 70 according to an embodiment. The module cover 73 may include first connection openings 74, each of which receives or accommodates a first connection pin 41 for securing the module cover 73 to the CCU 50. FIG. 8 further shows in detail the third connection opening 76 that exposes a portion of the terminal busbar 21 in order to provide a module terminal that can be externally contacted. FIG. 9 illustrates a similar detailed view of a battery module 70 as in FIG. 8 but without the module cover 73 and with an additional first housing profile 71 that extends in the stacking direction along the stacked battery cells 10, e.g., along the narrow side surfaces of the stacked battery cells 10.

FIG. 9 shows details of the inset carrier rails 37. FIG. 9 illustrates the first reception region 31 of the inset carrier rail 37 with the U-shaped reception space 33 and the second reception region 32 of the inset carrier rail 37 with the reception apertures 34, 35. FIG. 9 further shows that a whole middle portion 27 of an inset busbar 22 is inserted into the reception space 33 of the first reception region 31 and that connection portions 23.1, 23.2 are inserted into the reception apertures 34, 35 of the second reception region 32. FIG. 9 further shows in more detail the first connection pins 41 protruding upwardly from the inset carrier rail 37 for mechanically fixing the module cover 73 to the battery module 70. Further shown is a temperature sensor mount 43 that protrudes sideways or laterally from one of the inset carrier rails 37 and may receive a temperature sensor thereon. The temperature sensor mount 43 may further include a clip for securing the temperature sensor to the temperature sensor mount 43. FIG. 9 also shows cable attacher 44, e.g., cable clips, that protrude upwardly from each of the insert carrier rails 37 and that are formed monolithically with the inset carrier rails 37.

Figure 10:
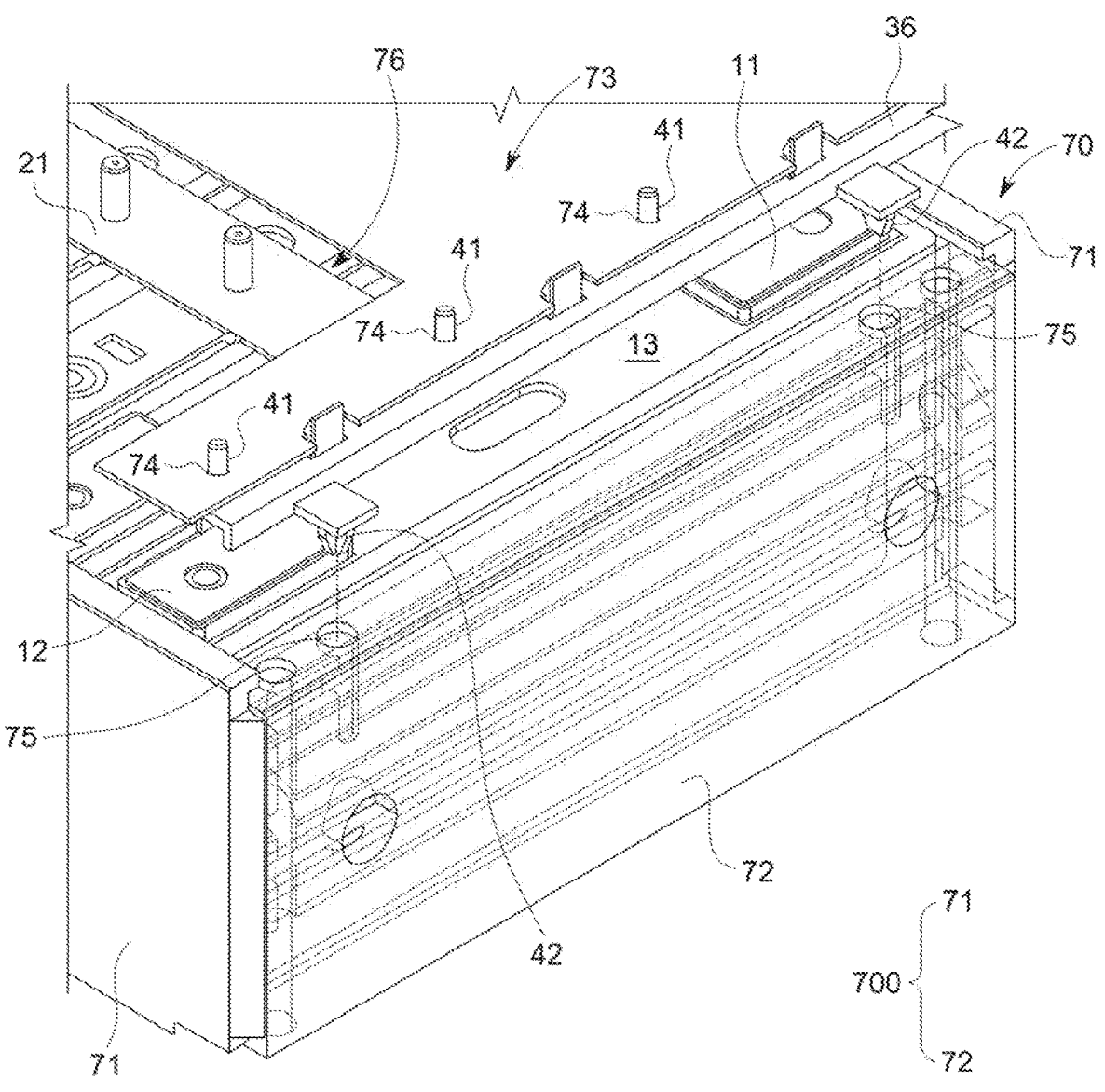
FIG. 10 illustrates a housing of a battery module according to an embodiment.
Figure 11:
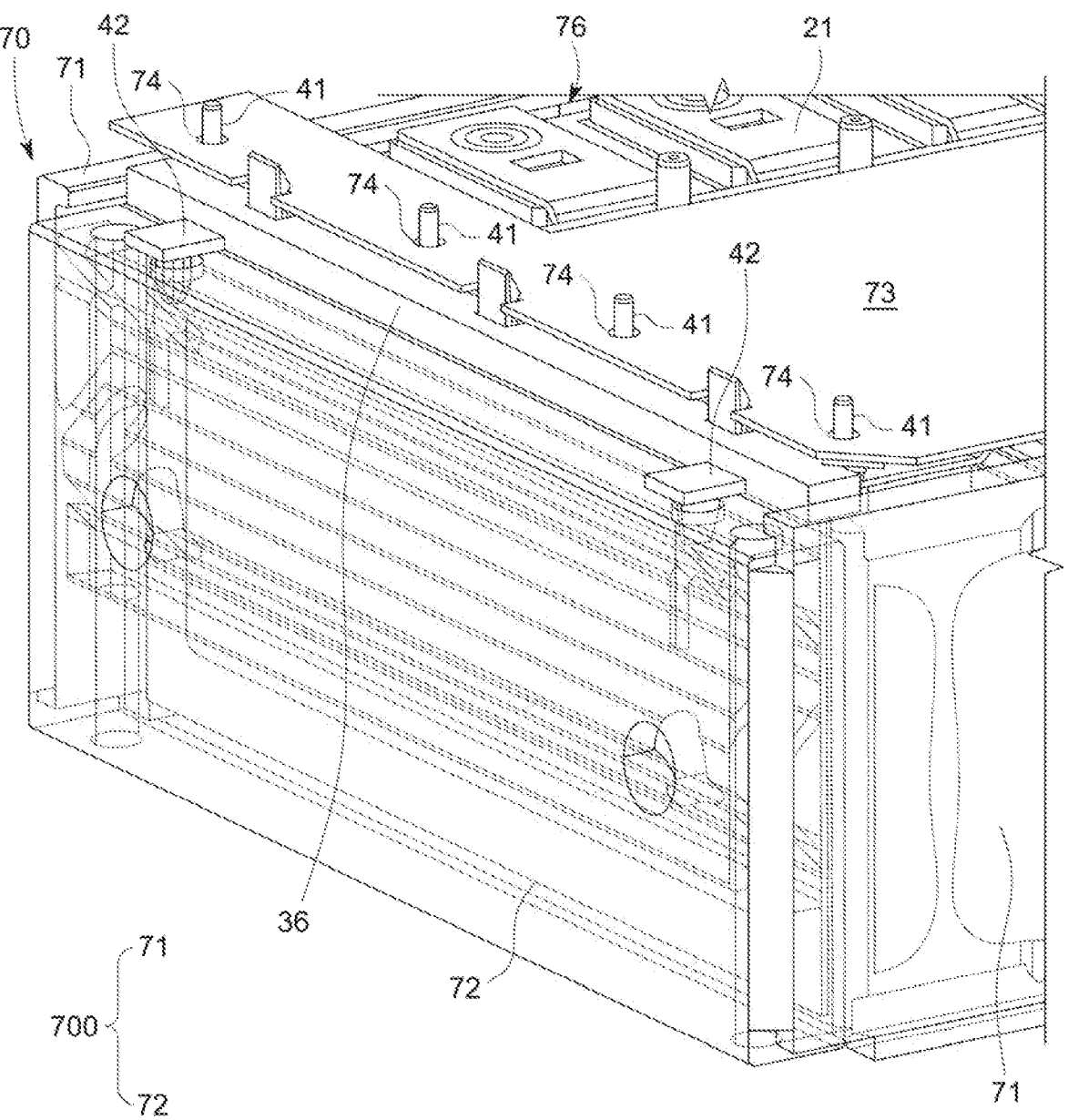
FIG. 11 illustrates the housing of the battery module of FIG. 10.

FIGS. 10 and 11 illustrate further details of a housing 700 of a battery module 70 according to an embodiment. The housing 700 may include first housing profiles 71 (e.g., walls), each of which extends in the stacking direction along the stacked and aligned battery cells 10, e.g., along narrow sides of the battery cells 10. In an implementation, the housing 700 may include second housing profiles 72 that extend in a direction that is perpendicular to the stacking direction of the cells 10, e.g., parallel to the longitudinal direction of the carrier rails 30. The first and second housing profiles 71, 72 may be of the same height as the battery cells 10 or even higher. In an implementation, the first and second housing profiles 71, 72 may be hollow aluminum profiles. The first and second housing profiles 71, 72 may be connected to each other via, e.g., a mortise joints or the like, or may be welded to each other. In an implementation, at least the second housing profiles 72 may include second connection openings 75 in a top surface thereof. These second connection openings 75 may receive or accommodate second connection pins 42 that protrude downwardly, e.g., in a direction that is opposite the normal direction of a cell cover 13 of the battery cells 10, from the terminal carrier rails 37. The connection of the second connection pins 42 and the second connection openings 75 may mechanically connect the CCU 50 to the housing profiles 71, 72 of the battery module 70.

According to an embodiment, a cell connection unit, CCU, may connect a plurality of aligned battery cells of a battery module. In an implementation, the battery cells may be prismatic battery cells and/or aligned in a stacking direction of the module. The CCU may include a plurality of busbars, and each busbar may be connected to cell terminals of at least two battery cells. The busbars may be bar-shaped aluminum busbars that are fitted to the size of the cell terminals to be connected. The busbars may further include bent and/or flexible portions.

The CCU according to an embodiment may include a plurality of carrier rails that interconnect the plurality of busbars of the CCU. In an implementation, the carrier rails act as carrying structures of the CCU that connect to the busbars. The carrier rails may be linearly shaped and may be configured as a rail. In an implementation, each carrier rail may be mechanically connected to a plurality of busbars and may include a plurality of reception regions, each reception region may be mechanically connected to at least one individual busbar.

In an implementation, the carrier rails may include terminal carrier rails at a terminal end of the CCU and inset carrier rails that are not at terminal ends of the CCU. At least some of the carrier rails of the CCU, e.g., each of the inset carrier rails, may be mechanically connected to at least three busbars. In an implementation, at least some of the carrier rails, e.g., each of the inset carrier rails, may include a first reception region that is connected to at least one bus bar and may further include a separate second reception region. The second reception region may be connected to two busbars and may electrically insulate these two busbars from each other. The design of the terminal carrier rails may differ from the design of the inset carrier rails, as the terminal carrier rails may connect fewer busbars than the inset carrier rails.

The CCU according to an embodiment may provide a modular system for constructing a CCU for electrically interconnecting the battery cells of a battery module, while being lightweight and while being suitable for automated or semi-automated fabrication of battery modules. In an implementation, the CCU may be handled as a whole and thus the handling of individual busbars may not be required in mounting a battery module. At the same time, the CCU according to an embodiment may be easily adapted to different battery module designs.

In an implementation, a carrier rail, e.g., each of the carrier rails (e.g., inset carrier rails and terminal carrier rails), may extend (e.g., lengthwise) in a longitudinal direction. When the battery cells of the battery module are aligned in a stacking direction of the battery module, the longitudinal direction of the carrier rail may be perpendicular to the stacking direction. At least some of the carrier rails, e.g., each of the (inset) carrier rails, may include a first reception region for receiving a busbar. In an implementation, the first reception region may include a reception space that is oriented in the longitudinal direction of the carrier rail. In an implementation, the reception space may be opened at one side, and the opening may face in the longitudinal direction.

In an implementation, the first reception region may be essentially U-shaped with two legs of the first reception region enclosing the reception space of that region. For receiving a busbar in the first reception region, the busbar may be slid into the reception space along the longitudinal direction of the carrier rail. The reception space may further include guide and/or latches for positioning and/or latching the busbar in the reception space. In an implementation, a whole width of the busbar may be received by the reception space and/or the busbar may not need a specific design for being compatible with the reception space. In an implementation, a busbar part that is received by the reception space may be flat and/or a thickness of that part corresponds to an opening width of the reception space.

In an implementation, a carrier rail may extend in a longitudinal direction, and each of the (inset) carrier rails may include a second reception region. In an implementation, if the carrier rail extends in the longitudinal direction, the first reception region may be at one terminal end of the carrier rail and the second reception region may be at a second terminal end of the carrier rail that is spaced apart from the first terminal end. The second reception region may include a first reception aperture that is oriented in a first direction, and the first direction may be perpendicular to the longitudinal direction of the carrier rail. In an implementation, the second reception region may include a second reception aperture that is oriented in a second direction that is opposite to the first direction. In an implementation, an orientation of a reception aperture may be the facing direction of that reception aperture, e.g., of an opening of the reception aperture. The first reception aperture according to an embodiment may be electrically insulated from the second reception aperture.

In an implementation, a first busbar may be connected to the second reception region by receiving at least a part of the first busbar by the first reception aperture. In an implementation, the part of the first busbar may be received along the second direction. Further, a second busbar may be connected to the second reception region by receiving at least part of the second busbar by the second reception aperture. In an implementation, the part of the second busbar may be received along the first direction. In an implementation, two busbar can be connected to a single carrier rail in the second reception region. In an implementation, the first and second reception aperture may be shifted with respect to each other along the longitudinal direction of the carrier rail. In an implementation, the first and second reception aperture may also be in the same longitudinal section of the second reception region and separated from each other solely by a partition wall of the carrier rail between the first and second reception apertures.

In an implementation, the carrier rails of the cell connection unit may be formed of a plastic material, e.g., a lightweight plastic material. The plastic material may include, e.g., PP, PE, PI, LDPE, HDPE, or the like. In an implementation, the plastic material may be a filled plastic material, wherein the filling may include reinforcing fibers or the like. In combination with aluminum busbars or busbars including aluminum, the carrier rails of this embodiment realize a lightweight CCU. The material of the carrier rails may include an electrically insulating material.

Although being lightweight, the interconnected pluralities of busbars and carrier rails together may form a rigid structure that facilitates automated mounting of the CCU to a battery module. In an implementation, the interconnected pluralities of busbars and carrier rails may be of an essentially planar shape that may neither be twisted nor bent, butted or elongated. In combination with the lightweight materials of the CCU the handling of the CCU may be improved.

In an implementation, each of the first and second reception apertures of the second reception region may include guides for facilitating the receiving of a busbar, e.g., of a connection portion of a busbar. The guides may facilitate an insertion of a part of a busbar into the respective reception aperture only in a single configuration, e.g., orientation, of the busbar. In an implementation, each of the first and second reception apertures of the second reception region may include latches for latching a received portion of a busbar, e.g., for latching a received connection portion of a busbar. In an implementation, the guides may be fitting counterparts (e.g., complementary) to guiding elements in the connection portion of a busbar. In an implementation, the latches may include flexibly moving and/or elastic elements for holding counterparts of the connection portion.

The cell connection unit according to an embodiment may include two terminal busbars to be connected to cell terminals of a plurality of, e.g., "n" number of, battery cells, in which "n" is an integer. In an implementation, at least one battery cell connected by the terminal busbar may be a terminal battery cell of the battery module, e.g., a battery cell having only on one side another battery cell of the battery module. In an implementation, the remaining busbars of the plurality of busbars of the cell connection unit may be inset busbars that are connected to cell terminals of "2*n" number of battery cells, e.g., connected to double the number of battery cells compared to the terminal busbars. In an implementation, the inset busbars may have a length that is essentially double the length of the terminal busbars. The shape of terminal busbars may further differ from the shape of the terminal busbars, e.g., for providing contactable module terminals. In an implementation, the plurality of carrier rails of the CCU may include two terminal carrier rails and the remaining carrier rails may be inset carrier rails of the CCU.

In an implementation, the plurality of carrier rails may include two terminal carrier rails forming terminal ends of the CCU and the remaining carrier rails may be inset carrier rails. The terminal carrier rails may include two third reception regions, each of which may be positioned at a terminal end of the terminal carrier rail. In an implementation, each of the third reception regions may include a third reception aperture for receiving a part of a busbar therein, e.g., for receiving a connection portion of a busbar therein. The third reception apertures may face towards the inset carrier rails of the CCU.

In an implementation, each of the busbars may include a first connection portion protruding from a first short side thereof and a second connection portion protruding from a second short side thereof, wherein the second short side is opposite the first short side. These first and second connection portions of the busbars may be inserted to a reception aperture of a carrier rail. In an implementation, the connection portions of the busbars may include guiding and latching elements that correspond to the guides and latches of the reception apertures. In an implementation, the terminal busbars of the CCU may each include a first connection portion that is connected to a third reception aperture of a terminal carrier rail and a second connection portion that is connected to a second reception region (e.g., first or second reception aperture) of an inset carrier rail. In an implementation, two inset busbars may include a first connection portion that is connected to a third reception aperture of a terminal carrier rail and a second connection portion that is connected to a second reception region (e.g., first or second reception aperture) of an inset carrier rail. The remaining inset busbars may include a first connection portion that is connected to a first reception aperture of an inset carrier rail and a second connection portion that is connected to a second reception aperture of another inset carrier rail.

In an implementation, a middle portion of an inset busbar may be inserted into a reception space of a first reception region. In an implementation, each inset busbar may be connected to two reception apertures with its terminal connection portions and may be further connected to a reception space of another inset carrier rail with its middle portion. Hence, each inset busbar may be connected to a total of three carrier rails, and terminal busbars may be connected to only two carrier rails. As the inset busbars have a length that is double the length of the terminal busbars, connecting them to three carrier rails may advantageously provide a mechanically stable CCU, while a connection to two carrier rails may be sufficient for the shorter terminal busbars.

In an implementation, at least some of the carrier rails may include a module cover attacher. In an implementation, the module cover attacher, e.g., a cover of a battery module, may include first pins that protrude in a normal direction of a cell cover of the battery cells of the battery module, and the module cover may include corresponding openings for receiving those first pins. In an implementation, at least some of the carrier rails may include a temperature sensor mount, and the temperature sensor may detect temperatures of some of the battery cells of the battery module. In an implementation, the temperature sensor mount may include a protrusion that extends from the carrier rail and provides a landing space for the temperature sensor. In an implementation, at least some of the carrier rails may include cable clips. In an implementation, the cable clips may be monolithically formed with a carrier rail. In an implementation, the two terminal carrier rails may further include an attacher or mount for a housing component of the battery module. In an implementation, the housing components may be housing profiles that form sidewalls of the battery module. In an implementation, connectors to those housing components may include second pins protruding in a direction opposite to a normal direction of a cell cover of the battery cells of the module and the housing components may include corresponding openings for receiving those second pins.

Another embodiment may provide a battery module with a cell connection unit, CCU. In an implementation, the battery module may include a plurality of battery cells that are aligned in a stacking direction of the battery module. In an implementation, the stacking direction may be perpendicular to the longitudinal direction of the CCU as described above. In an implementation, each battery cell of the battery module may include a cell cover with a first, e.g., positive, terminal and with a second, e.g., negative, terminal.

The battery module of the present disclosure may further include a plurality of busbars. In an implementation, the busbars may include two terminal busbars that are each connected to cell terminals of "n" number of terminal battery cells, one of which is a terminal battery cell of the module. In an implementation, the remaining busbars of the plurality of busbars may be inset busbars that are each connected to cell terminals of "2*n" number of battery cells. In an implementation, two of the inset busbars may each be connected to one terminal battery cells while the remaining cells may be inset battery cells. The battery module may further include a plurality of carrier rails, two of which are terminal carrier rails and the remaining carrier rails being inset carrier rails. In an implementation, each terminal carrier rail may be connected to one terminal busbar and one inset busbar.

In an implementation, each inset carrier rail of the battery module may include a first reception region that is connected to a middle portion of a first insert busbar as described above. In an implementation, each inset carrier rail may include a separate second reception region that has a first reception aperture that is connected to a connection portion of a second insert busbar and further has a second reception aperture that is opposite to and insulated from the first reception aperture. In an implementation, the second reception aperture may be connected to a connection portion of a third insert busbar or to a connection portion of a terminal busbar, depending on its position in the CCU.

The battery module according to an embodiment may further include a module cover with a plurality of first connection openings. In an implementation, first connection pins may protrude from the carrier rails in a normal direction of the cell covers of the battery cells of the battery module. The first connection pins may be inserted into the first connection openings of the battery module cover to form a mechanical connection between CCU and cover. In an implementation, the pins may include latches to facilitate latching within the openings.

The battery module of according to an embodiment may include two first housing profiles, each extending along sides of the aligned battery cells in the stacking direction. The battery module may include two second housing profiles, each of which is extending along a terminal battery cell of the aligned battery cells in a direction perpendicular to the stacking direction. In an implementation, together the first and second housing profiles may form a housing frame that encloses the battery module circumferentially. The battery module may further include a base plate and the combination of base plate, housing frame and module cover may form a battery module housing completely enclosing the battery module. In an implementation, second connection pins may protrude from the carrier rails, e.g., from the terminal carrier rails, in a direction opposite a normal direction of the cell covers. In an implementation, the first and/or second housing profiles may include second connection openings and the second connection pins may be inserted into the second connection openings to form a mechanical connection between the CCU and housing frame. In an implementation, the second pins may include latches to facilitate latching in the openings.

By way of summation and review, for meeting the dynamic power demands of various electrical consumers connected to the battery system a static control of battery power output and charging may be insufficient. Steady exchange of information between the battery system and the controllers of the electrical consumers may occur. This information may include the battery systems actual state of charge (SoC), potential electrical performance, charging ability, and internal resistance as well as actual or predicted power demands or surpluses of the consumers.

Battery systems may include a battery management system (BMS) and/or battery management unit (BMU) for processing the aforementioned information. The BMS/BMU may communicate to the controllers of the various electrical consumers via a suitable communication bus, e.g. a SPI or CAN interface. The BMS/BMU may further communicate with each of the battery submodules, particularly with a cell supervision circuit (CSC) of each battery submodule. The CSC may be further connected to a cell connection unit (CCU) of a battery submodule that interconnects the battery cells of the battery submodule.

The CCU of a battery module may electrically interconnect the battery cells of the battery submodule, particularly the cell terminals of the battery cells. The CCU may include a plurality of busbars, each of which is interconnecting the cell terminals of at least some battery cells. For manufacturers, it may be advantageous if the CCU is provided as a monolithic structure that enables to mount all the busbars to the battery module at once, e.g., in an automated or at least semi-automated fabrication method. Some CCUs may include a plurality of busbars which are injection molded with a plastic material to form a monolithic unit. In some CCUs, a plurality of busbars may be between layers, e.g., insulating foil layers with predefined openings that correspond to the positions of cell terminals, and may fixedly connect the layers, e.g., thermally.

Some mountable CCUs may be provided as monolithic units, and the busbars may be connected to each other in an essentially inextricable manner. An adaptability of the CCUs to different battery modules may be limited and production of battery modules may be complicated and more expensive.

One or more embodiments may provide a cell connection unit that has an increased variability and is usable for connecting battery cells of various battery modules. One or more embodiments may provide a cell connection unit for improved [0075] mounting and handling.

One or more embodiments may provide a CCU for connecting a plurality of aligned battery cells of a battery module. The battery cells may be prismatic battery cells and/or aligned in a stacking direction of the module. The CCU may include a plurality of busbars, and each busbar may be connected to cell terminals of at least two battery cells. The busbars may be bar-shaped aluminum busbars that are fitted to the size of the cell terminals to be connected. The busbars may further include bent and/or flexible portions.

The CCU may further include a plurality of carrier rails that interconnect the plurality of busbars of the CCU. The carrier rails may act as carrying structures of the CCU that connect to the busbars. The carrier rails may be linearly shaped and may be configured as a rail. Each carrier rail of the plurality may be mechanically connected to a plurality of busbars and may include a plurality of reception regions, wherein each reception region may be mechanically connected to at least one individual busbar.

The CCU according to an embodiment may advantageously provide a modular system for constructing a CCU for electrically interconnecting the battery cells of a battery module, while being lightweight and while being suitable for automated or semi-automated fabrication of battery modules. The CCU according to an embodiment may be handled as a whole and the handling of individual busbars may not be required in mounting a battery module. At the same time, the CCU according to an embodiment may be easily adapted to different battery module designs.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A cell connection unit (CCU) for connecting a plurality of aligned battery cells of a battery module, the CCU comprising:
    a plurality of busbars, each busbar of the plurality of busbars being connected to cell terminals of at least two battery cells of the plurality of aligned battery cells; and
    a plurality of carrier rails, at least some carrier rails of the plurality of carrier rails being mechanically connected to at least three busbars of the plurality of busbars,
    wherein each of the at least some carrier rails of the plurality of carrier rails is connected to three separate busbars of the plurality of busbars and includes:
        a first reception region at one end and connected to one busbar of the at least three busbars of the plurality of busbars, and receives the one busbar, and
        a separate second reception region at another end and connected to two busbars of the at least three busbars of the plurality of busbars, the second reception region extending completely between the two busbars to physically separate the two busbars and electrically insulate the two busbars from each other, and the second reception region receiving the two busbars from opposite directions,
    wherein the first reception region has a U-shape that wraps around a bottom surface, a side surface, and a top surface of a middle portion of the one busbar,
    wherein the second reception region has a first reception aperture and a second reception aperture shifted with respect to the first reception aperture along a lengthwise direction of a carrier rail of the at least some carrier rails, the first reception aperture and the second reception aperture accommodating the two busbars of the at least three busbars,
    wherein each carrier rail of the plurality of carrier rails extends in a lengthwise direction that is orthogonal to a lengthwise direction of each busbar of the plurality of busbars, and
    wherein tops of the first and second reception apertures are coplanar with each other, and bottoms of the first and second reception apertures are coplanar with each other.

2. The CCU as claimed in claim 1, wherein:
    one carrier rail of the at least some carrier rails of the plurality of carrier rails extends in a longitudinal direction, and
    the first reception region includes a reception space oriented in the longitudinal direction of the one carrier rail.

3. The CCU as claimed in claim 1, wherein:
    one carrier rail of the at least some carrier rails of the plurality of carrier rails extends in a longitudinal direction, and
    the first reception aperture is oriented in a first direction perpendicular to the longitudinal direction of the one carrier rail and the second reception aperture is oriented in a second direction opposite to the first direction.

4. The CCU as claimed in claim 1, wherein the plurality of carrier rails are formed of a plastic material.

5. The CCU as claimed in claim 1, wherein the plurality of busbars and the plurality of carrier rails are interconnected in a rigid structure, for automated mounting of the CCU to the battery module.

6. The CCU as claimed in claim 3, wherein each of the first and second reception apertures includes a guide that is configured to receive a corresponding connection portion of the busbar and a latch that is configured to latch the corresponding connection portion of the busbar.

7. The CCU as claimed in claim 1, wherein:

the plurality of busbars includes:

two terminal busbars connected to cell terminals of "n" number of battery cells, and inset busbars connected to cell terminals of "2n" number of battery cells, and the plurality of carrier rails includes:

two terminal carrier rails forming terminal ends of the CCU, and inset carrier rails.

8. The CCU as claimed in claim 7, wherein:

the two terminal carrier rails each include two third reception regions at terminal ends thereof, and each third reception region includes a single reception aperture.

9. The CCU as claimed in claim 3, wherein:

each busbar of the plurality of the busbars includes a first connection portion protruding from a first short side thereof and a second connection portion protruding from a second short side thereof opposite the first short side, and the first and second connection portions are accommodated in corresponding ones of the first and second reception apertures.

10. The CCU as claimed in claim 7, wherein the middle portion of each inset busbar is accommodated in a corresponding reception space of a corresponding first reception region.

11. The CCU as claimed in claim 1, wherein the at least some of the carrier rails of the plurality of carrier rails include a module cover mount, a temperature sensor mount, or cable clips.

12. The CCU as claimed in claim 7, wherein the two terminal carrier rails further include a battery module housing attachment.

13. The CCU as claimed in claim 1, wherein the one busbar is between two parallel portions of the U-shape of the first reception region, the two parallel portions overlapping two major surfaces of the one busbar, respectively.

14. The CCU as claimed in claim 1, wherein the first and second reception apertures of the second reception region are aligned along a direction parallel to a longitudinal direction of one of the battery cells.

15. The CCU as claimed in claim 1, wherein each of the plurality of carrier rails has a linear shape in its entirety, the linear shape extending along a direction parallel to a longitudinal direction of one of the battery cells, and the first and second reception regions being at opposite sides of the linear shape along a longitudinal direction of the linear shape.

16. The CCU as claimed in claim 15, wherein a length of each of the plurality of carrier rails substantially equals a length of one of the battery cells along a direction parallel to a longitudinal direction of the one of the battery cells.

* * * * *